United States Patent
Miura et al.

(10) Patent No.: US 8,421,319 B2
(45) Date of Patent: Apr. 16, 2013

(54) BEARING HOLDER MOUNTING STRUCTURE AND MOTOR

(75) Inventors: Yukio Miura, Nagano (JP); Mitsuaki Shioiri, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 313 days.

(21) Appl. No.: 13/056,731

(22) PCT Filed: Aug. 3, 2009

(86) PCT No.: PCT/JP2009/063738
§ 371 (c)(1),
(2), (4) Date: Jan. 31, 2011

(87) PCT Pub. No.: WO2010/013829
PCT Pub. Date: Feb. 4, 2010

(65) Prior Publication Data
US 2011/0156542 A1    Jun. 30, 2011

(30) Foreign Application Priority Data
Aug. 1, 2008  (JP) .................................. 2008-199857

(51) Int. Cl.
*H02K 5/16*  (2006.01)
(52) U.S. Cl.
USPC .............. 310/425; 310/91; 384/539; 384/903
(58) Field of Classification Search .................. 310/425, 310/91; 384/537, 539, 903, 581
See application file for complete search history.

(56) References Cited

U.S. PATENT DOCUMENTS

| 4,364,615 | A | * | 12/1982 | Euler | 384/517 |
| 5,080,501 | A | * | 1/1992 | Siebert et al. | 384/537 |
| 6,338,578 | B1 | * | 1/2002 | Adde et al. | 384/540 |
| 2003/0002762 | A1 | * | 1/2003 | Kamura et al. | 384/537 |
| 2006/0119213 | A1 | | 6/2006 | Ju | |

FOREIGN PATENT DOCUMENTS

| JP | 2003-088081 | 3/2003 |
| JP | 2007-006592 | 1/2007 |
| JP | 2008-522578 | 6/2008 |

* cited by examiner

*Primary Examiner* — Tran N. Nguyen
*Assistant Examiner* — Naishadh Desai
(74) *Attorney, Agent, or Firm* — Rankin, Hill & Clark LLP

(57) ABSTRACT

A bearing holder mounting structure which allows a motor to be manufactured with a small number of parts without needing complex processing, and such motor are provided. A rotor 1 having a pair of bearings 5A and 5B and a washer 28 mounted thereon is inserted into an opening portion 23a of a motor housing 7 such that a rotor member 11 of the rotor 1 is received in a receiving concave portion 23. A bearing holder 9 is disposed on a bottom wall portion 29a of a fitting recessed portion 29 such that a flange portion 37 of the bearing holder 9 abuts on the bottom wall portion 29a of the fitting recessed portion 29. A retaining fitting 33 is then pressed into the fitting recessed portion 29 such that six engaging pieces 41 are located at positions slightly deviated from positions of six lead-out groove portions 31. With this arrangement, leading ends 41a of the six engaging pieces 41 are bitten in an inner peripheral wall portion 29b of the fitting recessed portion 29 due to resilient force by which the six engaging pieces 41 return to an original state from a warped state.

12 Claims, 13 Drawing Sheets

BEARING HOLDER MOUNTING STRUCTURE AND MOTOR

TECHNICAL FIELD

The present invention relates to a bearing holder mounting structure and a motor using the bearing holder mounting structure.

BACKGROUND ART

There has been known a motor comprising a rotor, a stator, a pair of bearings, and a motor housing. These components are configured as follows. The rotor includes a rotor member and a shaft on which the rotor member is fixed. The stator is disposed radially outwardly of the rotor member. The pair of bearings rotatably support both ends of the shaft. The stator is securely disposed inside the motor housing. Among the motors of this kind, there is a motor in which a bearing holder is mounted into a mounting hole formed in a motor housing. The bearing holder is fixed to an outer ring of one of a pair of bearings. As a bearing holder mounting structure configured to mount a bearing holder in a motor housing in this type of motor, Japanese Patent Application Publication No. 2007-6592 (JP2007-6592A) discloses an example in which the bearing holder is mounted in the motor housing using a plurality of screws, for example.

DISCLOSURE OF THE INVENTION

Technical Problems

In a conventional structure configured to mount a bearing holder in a motor housing using screws, complex work such as tapping is necessary. In addition, the number of components is increased. Further, when inspecting or repairing an inside of the motor, removal of the bearing holder from the motor housing and mounting of the bearing holder in the motor housing are laborious. Further, due to such removal and mounting operations, a plurality of screws or a plurality of screw threads in a screw hole may be broken.

An object of the present invention is to provide a bearing holder mounting structure which allows a motor to be manufactured with a small number of components, and to provide such motor.

Another object of the present invention is to provide a bearing holder mounting structure and a motor which allow ready removal of a bearing holder from a motor housing and ready mounting of the bearing holder in the motor housing.

A further object of the present invention is to provide a bearing holder mounting structure and a motor in which a mounting component for mounting a bearing holder in a motor housing may be re-used.

Solution to Problems

A bearing holder mounting structure of the present invention is configured to mount a bearing holder in a motor housing. The motor housing has a mounting hole formed therein, in which the bearing holder is fitted to be mounted in the motor housing. In the present invention, the bearing holder includes a holder body having a fitting hole formed therein, in which a bearing is fitted; and a flange portion unitarily formed with the holder body. The fitting hole in which the bearing is fitted may be a through-hole or a concave portion. An annular fitting recessed portion is formed at an outer end of the mounting hole. The flange portion of the bearing holder and a retaining fitting for retaining the bearing holder are fitted in the annular fitting recessed portion. The retaining fitting is disposed outwardly on the flange portion and abuts on the flange portion so that the bearing holder does not come off from the mounting hole of the motor housing. The retaining fitting has a larger hardness than a portion of the motor housing where the mounting hole is formed. The retaining fitting includes: a ring portion configured to abut on the flange portion of the bearing holder; and a plurality of engaging pieces formed with the ring portion and configured to be engaged on a wall portion surrounding the annular fitting recessed portion. The engaging pieces are disposed at predetermined angular intervals in a peripheral direction of the ring portion and extend from the ring portion outwardly in a radial direction of the ring portion. The material of the retaining fitting and shapes of the engaging pieces and the annular fitting recessed portion are determined such that, when the retaining fitting is pressed into the fitting recessed portion, the engaging pieces warp in an opposite direction to a pressing direction of the retaining fitting and leading ends of the engaging pieces bite in the wall portion due to resilient force by which the engaging pieces return to an original state from a warped state.

Assume that the bearing holder mounting structure is configured as in the present invention. Then, just by disposing the bearing holder in the fitting recessed portion of the motor housing and pressing the retaining fitting into the fitting recessed portion, the leading ends of the engaging pieces of the retaining fitting bite in the wall portion surrounding the fitting recessed portion, and the bearing holder is thereby fixed to the motor housing by the retaining fitting. Thus, the bearing holder may be readily mounted in the motor housing. Accordingly, a motor may be readily manufactured with a small number of components without needing complex work such as tapping as in conventional technical techniques. Further, when the retaining fitting is pressed into the fitting recessed portion, the leading ends of the engaging pieces of the retaining fitting bite in the wall portion surrounding the fitting recessed portion due to resilient force by which the engaging pieces return to the original state from the warped stage. Accordingly, the bearing holder may be firmly mounted in the motor housing.

Preferably, the predetermined angular intervals at which the engaging pieces are disposed may be constant. In other words, the "constant angular intervals" refers to equal angular intervals in the peripheral direction. A plurality of lead-out groove portions may be formed at an outer peripheral portion of the fitting recessed portion at the predetermined constant angular intervals. The lead-out groove portions open in the opposite direction to the pressing direction of the retaining fitting and in a radially inward direction of the outer peripheral portion of the fitting recessed portion. The length of each lead-out groove portion as measured in the peripheral direction is longer than that of each engaging piece as measured in the peripheral direction. A bottom surface of each lead-out groove portion is located more deeply in the pressing direction than the leading end of each engaging piece biting in the wall portion. In this configuration, by rotating the retaining fitting fixed within the fitting recessed portion by a predetermined angle in the peripheral direction and positioning the leading ends of the engaging pieces within the lead-out groove portions, the engaging pieces may be taken out from the lead-out groove portions, and the retaining fitting may be readily removed from the fitting recessed portion.

The retaining fitting removed from the fitting recessed portion returns to an original shape (a shape before the retaining fitting is pressed into the fitting recessed portion). Thus, when mounting the bearing holder in the motor housing again, the retaining fitting which has been used may be reused.

Preferably, an inclined surface, which is inclined in a radially outward direction of the outer peripheral portion of the fitting recessed portion, may be formed between adjacent two of the lead-out groove portions at the outer peripheral portion of the fitting recessed portion. In this configuration, when pressing the retaining fitting into the fitting recessed portion, the engaging pieces are inserted into the wall portion surrounding the fitting recessed portion after the leading ends of the engaging pieces have abutted on the inclined surface and have then gently warped. Thus, the engaging pieces may be smoothly warped in stages.

A plurality of groove portions for pressing the retaining fitting may be formed at the outer peripheral portion of the fitting recessed portion. The groove portions open in the opposite direction to the pressing direction of the retaining fitting and in the radially inward direction of the outer peripheral portion of the fitting recessed portion, and are disposed at predetermined angular intervals. The length of each groove portion as measured in the peripheral direction is set to be longer than that of each engaging piece as measured in the peripheral direction. A bottom surface of each groove portion located in the pressing direction is inclined such that the bottom surface becomes deeper in the radially inward direction, and is located more in the opposite direction than the bottom surface of each lead-out groove portion. Assume that the groove portions are formed in this manner. Then, by pressing the retaining fitting into the fitting recessed portion such that the engaging pieces are inserted into the groove portions, the engaging pieces abut on the wall portion surrounding the fitting recessed portion after the leading ends of the engaging pieces have abutted on the inclined bottom surfaces of the retaining groove portions and have then gently warped. Thus, also in this configuration, the engaging pieces may be gradually warped smoothly.

When the groove portions mentioned above constitute one group, groove portions constituting another group may be formed at the outer peripheral portion of the fitting recessed portion, with adjacent two of the groove portions of the one group and the other group spaced apart from each other by a predetermined angular interval. A part of the groove portions in which the engaging pieces have been inserted or a part of the wall portion in which the engaging pieces have bitten may be damaged. If the retaining fitting is removed from the fitting recessed portion and then is fitted again into the fitting recessed portion, the engaging pieces are inserted into the groove portions of the other group, which are different from the groove portions of the one group previously used, to press the retaining fitting into the fitting recessed portion. The bearing holder may thereby be securely mounted in the motor housing.

A plurality of groove portions may be formed at the outer peripheral portion of the fitting recessed portion. The groove portions open in the opposite direction to the pressing direction of the retaining fitting and in the radially inward direction of the outer peripheral portion of the fitting recessed portion and are disposed at angular intervals, which are 1/n or one-nth time of the constant angular intervals, n being an integer of at least one. The length of each groove portion as measured in the peripheral direction is set to be longer than that of each engaging piece as measured in the peripheral direction. A bottom surface of each groove portion is located in the pressing direction such that, when the leading ends of the engaging pieces of the retaining fitting are inserted into the groove portions and the retaining fitting is fitted in the fitting recessed portion, the ring portion abuts on the flange portion of the bearing holder which has been fitted in the fitting recessed portion. In this configuration, the retaining fitting is rotated by a predetermined angle in the peripheral direction after the leading ends of the engaging pieces of the retaining fitting have been inserted into the groove portions and the retaining fitting has been fitted in the fitting recessed portion. Then, the leading ends of the engaging pieces bite in the wall portion surrounding the fitting recessed portion. In this bearing holder mounting structure, by rotating the retaining fitting by the predetermined angle in the peripheral direction, the leading ends of the engaging pieces get into the wall portion surrounding the fitting recessed portion due to rotation, and the leading ends of the engaging pieces bite in the wall portion. Thus, the bearing holder may be firmly mounted in the motor housing, by this bearing holder mounting structure as well.

In this configuration, preferably, an inclined surface may be formed on the leading end of each engaging piece such that the length of the engaging piece as measured in a radial direction becomes longer from one end of the peripheral direction to the other end of the peripheral direction. With this arrangement, by rotating the retaining fitting in a direction from the other end of the peripheral direction to the one end of the peripheral direction, the leading ends of the engaging pieces may readily get into the wall portion surrounding the fitting recessed portion.

The groove portions are formed at the constant angular intervals, which are 1/n or one-nth time of the constant intervals at which the engaging pieces are formed, n being an integer of at least one. Thus, the number of the groove portions may also be set to a multiple of the number of the engaging pieces. Thus, when mounting the retaining fitting is removed from the fitting recessed portion and then is fitted again thereinto, the engaging pieces may be inserted into a plurality of the groove portions, which are different from a plurality of the groove portions previously used.
The bearing holder may thereby be securely mounted in the motor housing.

A motor improvement of which is aimed at by the present invention comprises: a rotor including a rotor member and a shaft on which the rotor member is fixed; a stator disposed radially outwardly of the rotor member such that the rotor member rotates inside the stator; a pair of bearings for rotatably supporting both ends of the shaft; and a motor housing inside which the stator is securely disposed. One of the bearings is held by the bearing holder and the other bearing is held by the motor housing. The motor housing has a mounting hole formed therein. A bearing holder is configured to be fitted in the mounting hole of the motor housing to be mounted in the motor housing. The bearing holder of the present invention includes: a holder body having a fitting hole formed therein, in which the bearing is fitted; and a flange portion unitarily formed with the holder body. The motor housing includes an annular fitting recessed portion formed at an outer end of the mounting hole. The flange portion of the bearing holder and a retaining fitting for retaining the bearing holder are fitted in the annular fitting recessed portion. The retaining fitting is disposed outwardly on the flange portion and abuts on the flange portion so that the bearing holder does not come off from the mounting hole. The retaining fitting has a larger hardness than a portion of the motor housing where the mounting hole is formed. The retaining fitting includes: a ring portion configured to abut on the flange portion; and a plurality of engaging pieces formed with the ring portion and configured to be engaged on a wall portion surrounding the annular fitting recessed portion. The engaging pieces are disposed at constant angular intervals in a peripheral direction of the ring portion and extend from the ring portion outwardly in a radial direction of the ring portion. The material of the retaining fitting and shapes of the engaging pieces and the fitting recessed portion are determined such that, when the retaining fitting is pressed into the fitting recessed portion, the engaging pieces warp in an opposite direction to a pressing direction of the retaining fitting and leading ends of the engaging pieces bite in the wall portion due to resilient force by which the engaging pieces return to an original state from a warped state. A plurality of lead-out groove portions are formed at an outer peripheral portion of the fitting recessed portion. The lead-out groove portions open in the opposite direction to the pressing direction of the retaining fitting and in a radially inward direction of the outer peripheral portion of the fitting recessed portion, and are disposed at the constant angular intervals. The length of each lead-out groove portion as measured in the peripheral direction is set to be longer than that of each engaging piece as measured in the peripheral direction. A bottom surface of each lead-out groove portion is located more deeply in the pressing direction than the leading end of each engaging piece biting in the wall portion.

Assume that the motor is configured as in the present invention. Then, just by disposing the bearing holder in the fitting recessed portion of the motor housing and pressing the retaining fitting into the fitting recessed portion, the leading ends of the engaging pieces of the retaining fitting bite in the wall portion surrounding the fitting recessed portion, and the bearing holder is fixed to the motor housing by the retaining fitting. Thus, the motor may be readily manufactured with a small number of components. Further, when the retaining fitting is pressed into the fitting recessed portion, the leading ends of the engaging pieces bite in the wall portion surrounding the fitting recessed portion due to resilient force by which the engaging pieces of the retaining fitting return to the original state from the warped stage. Thus, the bearing holder may be firmly mounted in the motor housing. Further, the lead-out groove portions are provided. Accordingly, by rotating the retaining fitting fixed in the fitting recessed portion in the peripheral direction and positioning the leading ends of the engaging pieces within the lead-out groove portions, the engaging pieces may be taker out from the lead-out groove portions, and the retaining fitting may thereby be readily removed from the fitting recessed portion. Further, the retaining fitting removed from the fitting recessed portion returns to an original shape. Thus, when mounting the bearing holder in the motor housing again, the retaining fitting that has been used may be re-used.

Even in such a motor, a plurality of groove portions may be formed at the outer peripheral portion of the fitting recessed portion. The groove portions open in the opposite direction to the pressing direction of the retaining fitting and in the radially inward direction of the outer peripheral portion of the fitting recessed portion, and are disposed at angular intervals, which are 1/n or one-nth time of the constant angular intervals, n being an integer of at least one. The length of each groove portion as measured in the peripheral direction is set to be longer than that of each engaging piece as measured in the peripheral direction. A bottom surface of each groove portion is located in the pressing direction such that, when the leading ends of the engaging pieces of the retaining fitting are inserted into the groove portions and the retaining fitting is fitted in the fitting recessed portion, the ring portion abuts on the flange portion of the bearing holder which has been fitted in the fitting recessed portion. In this configuration, the retaining fitting is rotated by a predetermined angle in the peripheral direction after the leading ends of the engaging pieces of the retaining fitting have been inserted into the groove portions and the retaining fitting has been fitted in the fitting recessed portion, and then the leading ends of the engaging pieces bite in the wall portion surrounding the fitting recessed portion. In the motor using this bearing holder mounting structure, by rotating the retaining fitting by the predetermined angle in the peripheral direction, the leading ends of the engaging pieces get into the wall portion surrounding the fitting recessed portion due to the rotation, and the leading ends of the engaging pieces bite in the wall portion. Thus, in the motor using this bearing holder mounting structure, the bearing holder may be firmly mounted in the motor housing.

The motor housing may be mold formed of a synthetic resin material using the stator as an insert. In this case, it is arranged that a receiving concave portion for receiving the rotor member is formed in the motor housing, and an opening of the receiving concave portion forms the mounting hole. In this configuration, just by inserting the rotor member from the opening of the receiving concave portion to place the rotor member within the receiving concave portion, disposing the bearing holder in the fitting recessed portion, and then pressing the retaining fitting into the fitting recessed portion, the rotor member may be readily disposed in the motor housing without using a member such as a screw.

The motor housing may be configured to have a bearing mounting hole formed at a position opposed to the mounting hole, for fitting with the other bearing. Then, an annular recessed portion may be formed at an outer end of the bearing mounting hole concentrically with the bearing mounting hole, and the other bearing may include a flange. In this configuration, a resilient annular washer is disposed between the flange of the other bearing and the annular recessed portion of the bearing mounting hole. With this arrangement, by using the flange of the other bearing, the annular washer for applying pre-compression may be readily disposed between the other bearing and the motor housing.

BEST MODE FOR CARRYING OUT THE INVENTION

Figure 1:
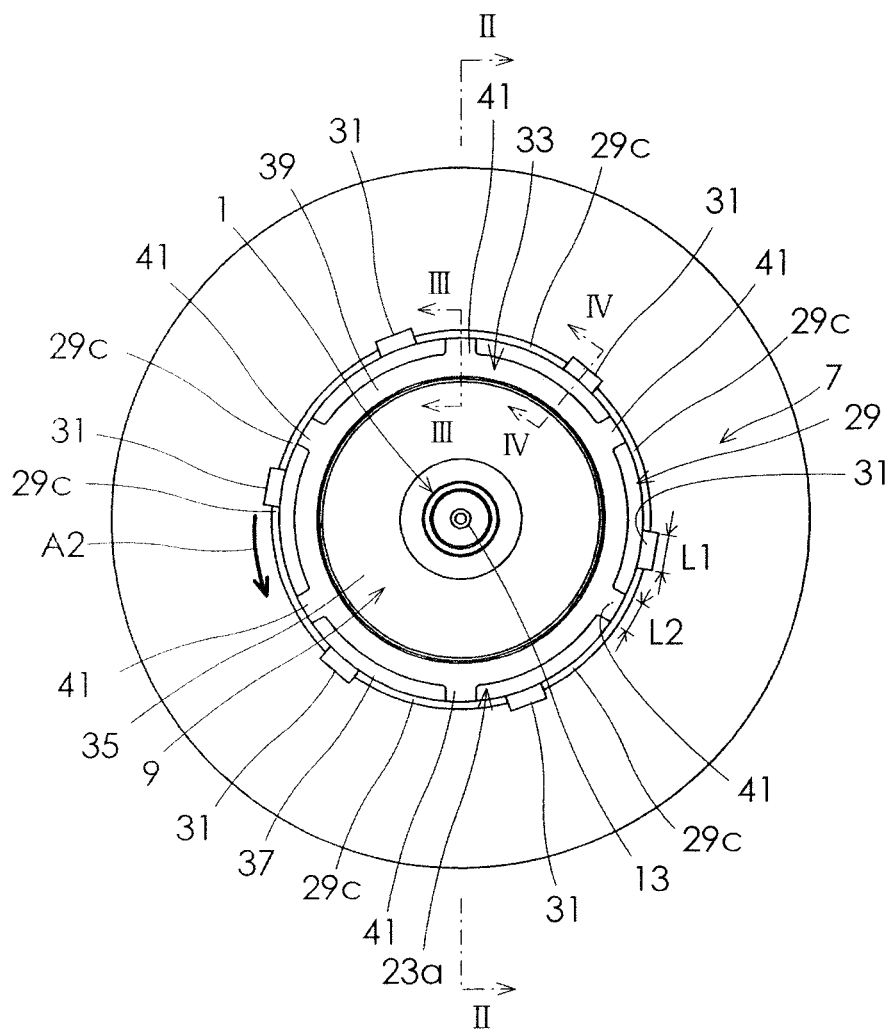
FIG. 1 is a plan view of a motor including a bearing holder mounting structure in an embodiment of the present invention.
Figure 2:
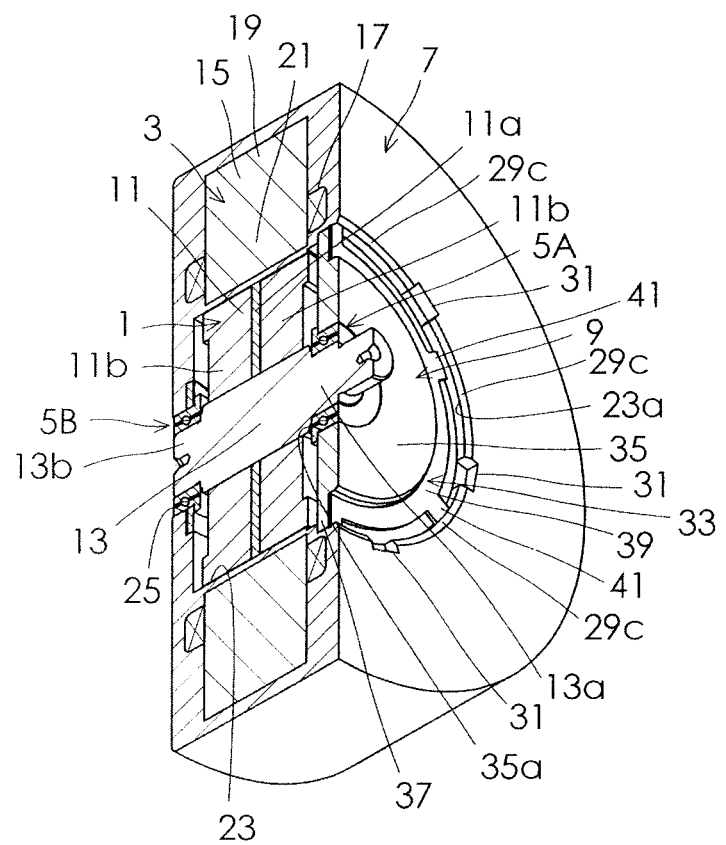
FIG. 2 is a perspective view showing a section taken along line II-II in FIG. 1.
Figure 3:
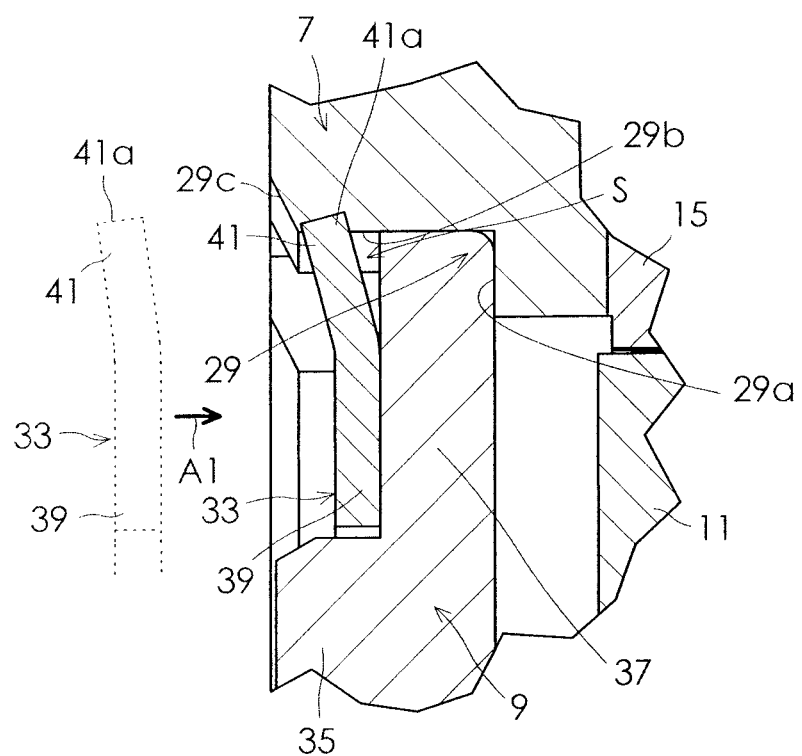
FIG. 3 is an enlarged view of a section taken along line III-III in FIG. 1.
Figure 4:
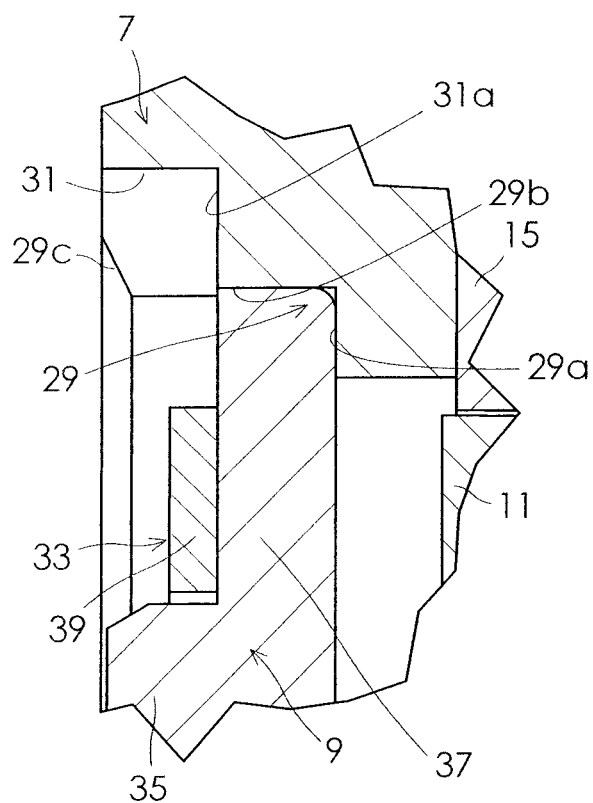
FIG. 4 is an enlarged view of a section taken along line IV-IV in FIG. 1.

Embodiments of the present invention will now be described below in detail with reference to drawings. FIG. 1 is a plan view of a motor including a bearing holder mounting structure in an embodiment of the present invention. FIG. 2 is a perspective view showing a section taken along line II-II in FIG. 1. FIG. 3 is an enlarged view of a section taken along line III-III in FIG. 1. FIG. 4 is an enlarged view of a section taken along line IV-IV in FIG. 1. As shown in FIG. 2, the motor in this embodiment includes a rotor 1, a stator 3, a pair of bearings 5A and 5B, a motor housing 7, and a bearing holder 9. The rotor 1 includes a rotor member 11 and a shaft 13 on which the rotor member 11 is fixed. The rotor member 11 includes one or more permanent magnets 11a and base portions 11b each formed by laminating magnetic steel plates. The shaft 13 includes an output end portion 13a located on the right side of the page of FIG. 2, to which a load is connected, and a non-output end portion 13b located on the left side of the page of FIG. 2.

The stator 3 includes a stator core 15 formed by laminating magnetic steel plates and a plurality of winding portions 17. The stator core 15 is disposed radially outwardly of the rotor member 11 such that the rotor member 11 rotates inside the stator core 15. The stator core 15 includes a cylindrical yoke 19 and a plurality of magnetic pole portions 21 projecting from the yoke 19 toward the shaft 13 to face the rotor member 11. The winding portions 17 are provided at the stator core 15, each being wound around the magnetic pole portions 21 through an insulator.

Figure 5:
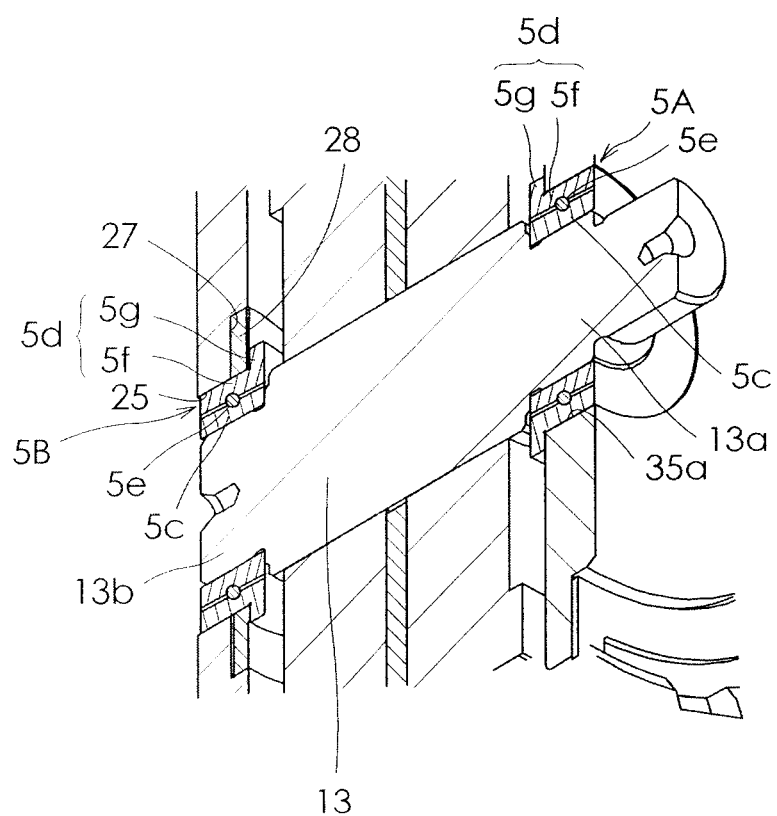
FIG. 5 is a partially enlarged view of FIG. 2.

Structures of the pair of bearings 5A and 5B will be described with reference to FIG. 5 which is a partially enlarged view of FIG. 2. Each of the bearings 5A and 5B includes an inner ring portion 5c, an outer ring portion 5d located radially outwardly of the inner ring portion 5c, and a plurality of balls 5e disposed between the inner ring portion 5c and the outer ring portion 5d. The outer ring portion 5d includes a cylindrical body portion 5f and a flange 5g projecting outwardly in a radial direction of the body portion 5f from an end portion of the body portion 5f. The inner ring portion 5c of the bearing 5A, which is one of the pair of the bearings 5A and 5B, is fixed to the output end portion 13a of the shaft 13. The inner ring portion 5c of the bearing 5B, which is the other of the pair of the bearings 5A and 5B, is fixed to the non-output end portion 13b of the shaft 13.

As shown in FIG. 2, the motor housing 7 is formed of plastic, and has a substantially columnar contour. The motor housing 7 includes a receiving concave portion 23 having an opening portion 23a on the side of the output end portion 13a of the shaft 13 and a bearing mounting hole 25 communicating with the receiving concave portion 23 and opening en the side of the non-output end portion 13b of the shaft 13. As shown in FIG. 5, the outer ring portion 5d of the bearing 5B, which is the other of the pair of the bearings 5A and 5B, is fitted in the bearing mounting hole 25. An annular recessed portion 27 is formed at an outer end of the bearing mounting hole 25, concentrically with the bearing mounting hole 25. A resilient annular washer 28 is disposed between the annular recessed portion 27 and the flange 5g of the bearing 5B fixed to the non-output end portion 13b of the shaft 13, which is the other bearing of the pair of bearings 5A and 5B.

As shown in FIG. 2, the opening portion 23a of the receiving concave portion 23 has a size capable of receiving the rotor 1. The rotor member 11 of the rotor 1 inserted through the opening portion 23a is placed inside the receiving concave portion 23. Then, the bearing holder 9 is mounted in the opening portion 23a constituting the mounting hole through the bearing holder mounting structure.

Figure 6:
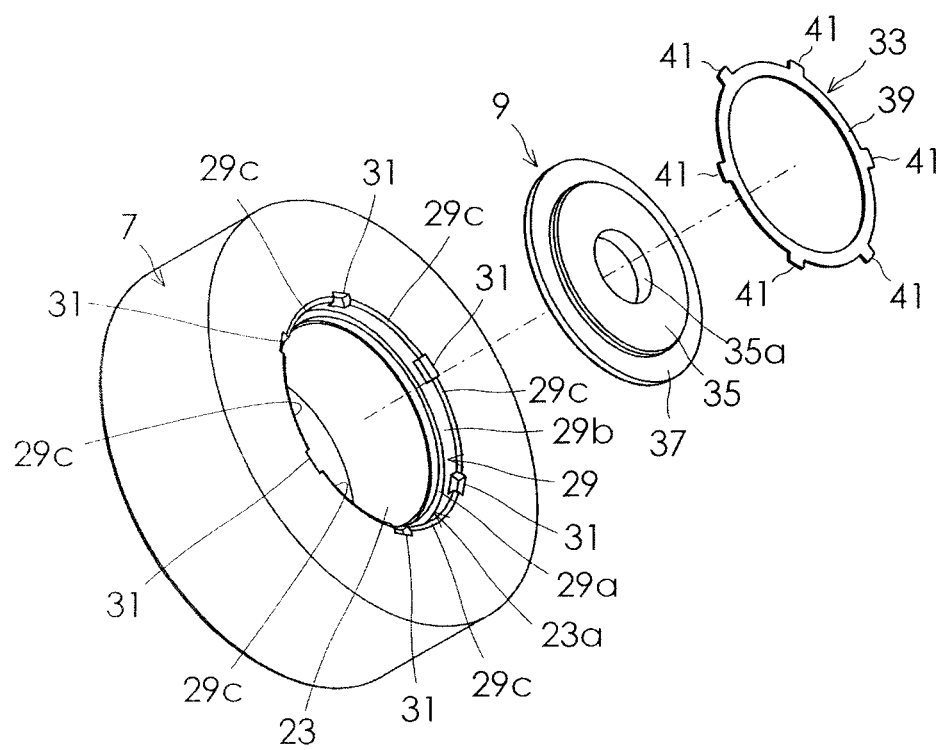
FIG. 6 is an exploded view used for explaining the bearing holder mounting structure of the motor shown in FIG. 1.

Now, the bearing holder mounting structure will be described below. As shown in an exploded view of FIG. 6, an annular fitting recessed portion 29 is formed at an outer end of the opening portion 23a. Then, the bearing holder 9 and a retaining fitting 33 for preventing the bearing holder 9 from coming off from the opening portion 23a are fitted in the fitting recessed portion 29. FIG. 6 is a perspective view showing the motor housing 7, the bearing holder 9, and the retaining fitting 33 which are disassembled. The rotor 1 and the pair of bearings 5A and 5B are omitted in this figure. The fitting recessed portion 29 is surrounded by an annular bottom wall portion 29a extending in a radial direction of the shaft 13 and an inner peripheral wall portion 29b opposed to the shaft 13. Six lead-out groove portions 31 are formed at an outer peripheral portion of the fitting recessed portion 29 at constant angular intervals of 60°. The structure of a lead-out groove portion will be described later in detail. Further, an arc-shaped inclined surface 29c inclined in a radially outward direction of the shaft 13 in a radial direction of a ring portion 39, which will be described later, is formed between adjacent two of the lead-out groove portions 31 at the outer peripheral portion of the fitting recessed portion 29.

The bearing holder 9 includes a holder body 35 and a flange portion 37. The holder body 35 has a shape of a circular plate, and has a cylindrical through-hole 35a formed in a central portion thereof. The cylindrical through-hole 35a constitutes a fitting hole in which the outer ring portion 5d of the bearing 5A, which is the one bearing, is fitted. The flange portion 37 is unitarily formed with the holder body 35 and projects outwardly in the radial direction of the shaft 13 from an end portion of the holder body 35. The flange portion 37 of the bearing holder 9 is fitted in the fitting recessed portion 29 such that The flange portion 37 abuts on the bottom wall portion 29a of the fitting recessed portion 29 and a gap portion S (refer to FIG. 3) is formed among the flange portion 37, the holder body 35, and the inner peripheral wall portion 29b of the fitting recessed portion 29.

The retaining fitting 33 is formed by processing a metal plate made of carbon steel or the like, unitarily includes the ring portion 39 and six engaging pieces 41, and is disposed in the gap portion S of the fitting recessed portion 29 (refer to FIG. 3). The retaining fitting 33 has a larger hardness than a portion of the motor housing 7, or a motor housing 7 as a whole in this embodiment, where the opening portion 23a of the motor housing 7 is formed. The ring portion 39 has a shape of a circular ring, and abuts on the flange portion 37 of the bearing holder 9 (refer to FIG. 1). The six engaging pieces 41 are disposed at constant angular intervals of 60° in a peripheral direction of the ring portion 39, and extends from the ring portion 39 outwardly in the radial direction of the ring portion 39. When the retaining fitting 33 is disposed in the gap portion S, the engaging pieces 41 warp with respect to the ring portion 39 in a direction opposite to a pressing direction of the retaining fitting 33 and leading ends 41a of the engaging pieces 41 bite in the inner peripheral wall portion 29b, as shown in FIG. 3.

In the motor of this embodiment, the rotor 1 and the bearing holder 9 are mounted in the motor housing 7 as follows. First, the rotor 1, on which the pair of the bearings 5A and 53 and the washer 28 are mounted, is inserted into the opening portion 23a of the motor housing 7 to place the rotor member 11 of the rotor 1 within the receiving concave portion 23. Next, the bearing holder 9 is disposed on the bottom wall portion 29a of the fitting recessed portion 29 such that the flange portion 37 of the bearing holder 9 abuts on the bottom wall portion 29a of the fitting recessed portion 29 and the bearing 5A, which is the one bearing, is fitted in the cylindrical through-hole 35a. Next, the retaining fitting 33 is brought close to the opening portion 23a of the motor housing 7 such that the six engaging pieces 41 are located at positions slightly deviated from positions of the six lead-out groove portions 31. At this point, care is taken such that the six lead-out groove portions 31 are not opposed to the six engaging pieces 41. As shown by a broken line in FIG. 3, before the retaining fitting 33 is disposed into the gap portion S, the engaging pieces 41 of the retaining fitting 33 slightly bend with respect to the ring portion 39. Next, the retaining fitting 33 is pressed into the fitting recessed portion 29. The leading ends 41a of the engaging pieces 41 abut on the inner peripheral wall portion 29b after the leading ends 41a have abutted an the inclined surfaces 29c. Then, the six engaging pieces 41 warp in the opposite direction to the pressing direction of the retaining fitting 33 as indicated by an arrow A1. When the retaining fitting 33 is pressed into the fitting recessed portion 29 until the ring portion 39 abuts on the flange portion 37 of the bearing holder 9, the leading ends 41a of the six engaging pieces 41 bite in the inner peripheral wall portion 29b due to resilient force by which the six engaging pieces 41 return to an original state from a warped state. Mounting of the bearing holder 9 is thereby completed. In other words, the material of the retaining fitting 33 and shapes of the six engaging pieces 41 and the fitting recessed portion 29 are determined such that, when the retaining fitting 33 is pressed into the fitting recessed portion 29, the six engaging pieces 41 warp in the opposite direction to the pressing direction of the retaining fitting 33 and the leading ends 41a of the six engaging pieces 41 bite in the inner peripheral wall portion 29b due to the resilient force by which the six engaging pieces 41 return to the original state from the warped state.

When removing the bearing holder 9 from the motor housing 7, the six lead-out groove portions 31 are used. As shown in FIGS. 1 and 4, the six lead-out groove portions 31 are formed at the outer peripheral portion of the fitting recessed portion 29 at the same angular intervals of 60° as the six engaging pieces 41 of the retaining fitting 33. Then, these lead-out groove portions 31 open in the opposite direction to the pressing direction of the retaining fitting 33 as indicated by the arrow A1 and in a radially inward direction of the shaft 13. The length L1 of each lead-out groove portion 31 as measured in the peripheral direction is longer than the length L2 of each engaging piece 41 in the peripheral direction. Further, a bottom surface 31a of each lead-out groove portion 31 located in the pressing direction as shown in FIG. 4 is located more deeply in the pressing direction than the leading end 41a of each engaging piece 41 biting in the inner peripheral wall portion 29b as shown in FIG. 3. When removing the bearing holder 9 from the motor housing 7, the retaining fitting 33 is rotated in a counterclockwise direction as indicated by an arrow A2 on the page of FIG. 1 to position the leading ends 41a of the six engaging pieces 41 within the six lead-out groove portions 31, using a jig. As the jig for rotating the retaining fitting 33, a jig integrally including a grip portion and a plurality of projecting portions unitarily formed with the grip portion, for example, may be used. In this case, the projecting portions of the jig should be inserted into a gap formed among the ring portion 39 and adjacent two of the engaging pieces 41 of the retaining fitting 33 to rotate the grip portion of the jig. Next, by taking out the engaging pieces 41 from the lead-out groove portions 31, the retaining fitting 33 is removed from the fitting recessed portion 29. Then, the bearing holder 9 and the rotor 1 with the pair of the bearings 5A and 5B mounted thereon are removed from the motor housing 7.

When removed from the fitting recessed portion 29, the retaining fitting 33 returns to an original shape before being disposed in the gap portion S in which each engaging piece 41 slightly bends with respect to the ring portion 39. For this reason, when mounting the bearing holder 9 and tee retaining fitting 33 in the motor housing 7 again, the retaining fitting 33 which has been previously used may be re-used to mount the bearing holder 9 according to the above-mentioned method of mounting the bearing holder 9.

According to the motor of this embodiment, just by inserting the rotor member 11 into the opening portion 23a of the receiving concave portion 23 to place the rotor member 11 within the receiving concave portion 23, disposing the bearing holder 9 in the fitting recessed portion 29, and then pressing the retaining fitting 3 into the fitting recessed portion 29, the rotor member 11 may be readily disposed in the motor housing 7 without using a member such as a screw. Further, the lead-out groove portions 31 are provided. Thus, just by rotating the retaining fitting 33 fixed within the fitting recessed portion 29 in the peripheral direction, the retaining fitting 33 may be readily removed from the fitting recessed portion 29. Further, the retaining fitting 33 removed from the fitting recessed portion 29 may be re-used.

Figure 7:
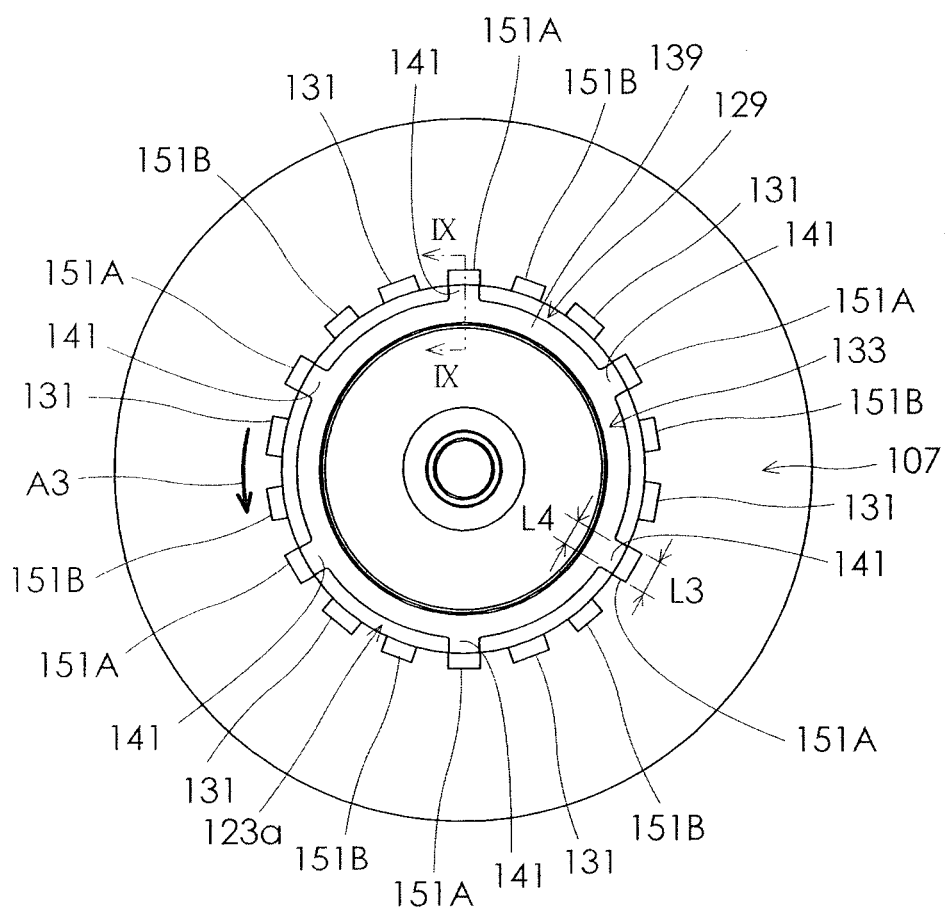
FIG. 7 is a plan view of a motor including a bearing holder mounting structure in another embodiment of the present invention.
Figure 8:
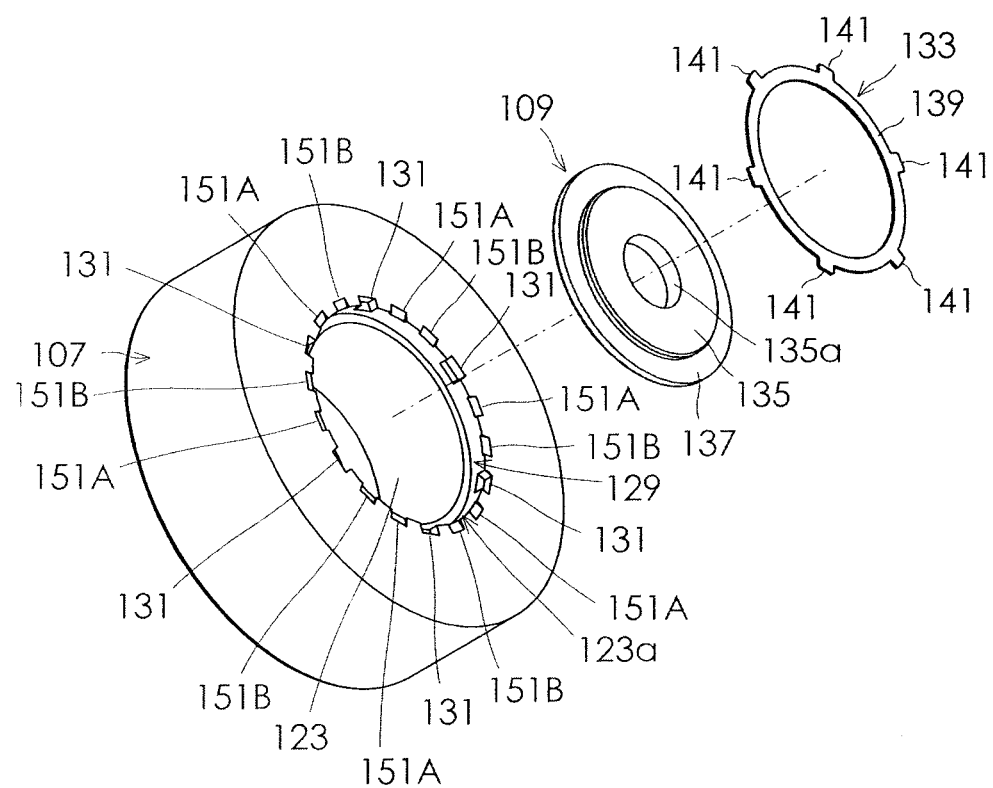
FIG. 8 is an exploded view used for explaining the bearing holder mounting structure of the motor shown in FIG. 7.
Figure 9:
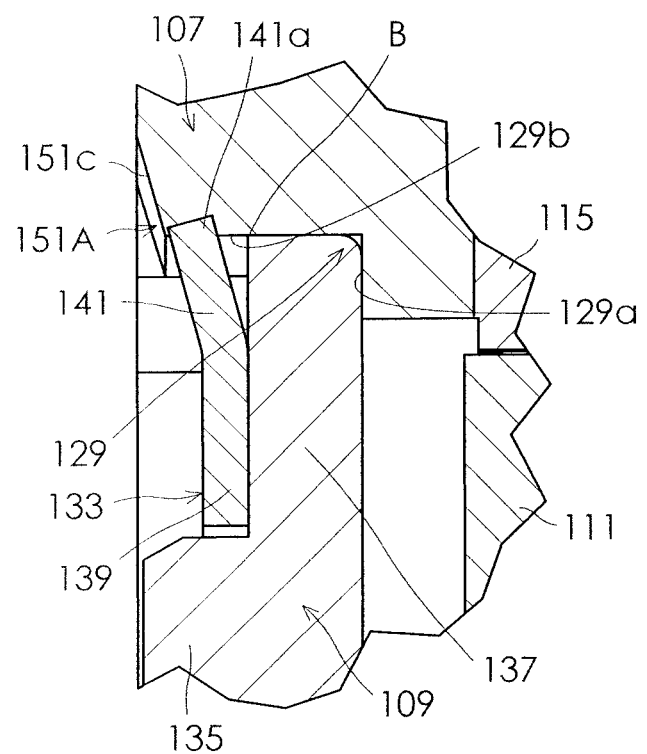
FIG. 9 is an enlarged view of a section taken along line IX-IX line in FIG. 7.

FIGS. 7 and 8 are respectively a plan view and an exploded view of a motor including a bearing holder mounting structure in another embodiment of the present invention. FIG. 9 is an enlarged view of a section taken along line IX-IX in FIG. 7. Referring to FIG. 8, a rotor 101 and a pair of bearings 105A and 105B are omitted. The motor of this embodiment has the same structure as the motor of the embodiment shown in FIGS. 1 to 6 except the structure of an outer peripheral portion of a fitting recessed portion 129 of a motor housing 107. Therefore, reference numerals calculated by adding 100 to the reference numerals in FIGS. 1 to 6 are assigned to members which are the same as those of the motor of the embodiment shown in FIGS. 1 to 6. Descriptions of the same members are thereby omitted. The inclined surfaces 29c in a circular form as shown in FIG. 6 are not formed at the outer peripheral portion of the fitting recessed portion 129 of the motor in this embodiment. 12 groove portions 151A and 151B for pressing a retaining fitting are formed at the outer peripheral portion of the fitting recessed portion 129. The 12 groove portions 151A and 151B can be divided into a first group comprising six groove portions 151A and a second group comprising six groove portions 151B. The six groove portions 151A of the first group are formed at the outer peripheral portion of the fitting recessed portion 129 at angular intervals equal to angular intervals of 60° at which six engaging pieces 141 of a retaining fitting 133 are formed in a peripheral direction of a ring portion 139. The six groove portions 151B of the second group are also formed at the outer peripheral portion of the fitting recessed portion 129 at angular intervals equal to the angular intervals of 60° at which the six engaging pieces 141 of the retaining fitting 133 are formed in the peripheral direction of the ring portion 139. Then, the six groove portions 151A of the first group and the six groove portions 151B of the second group are formed at the outer peripheral portion of the fitting recessed portion 129, with adjacent two of the groove portions 151A and 151B spaced apart from each other by a predetermined angular interval of 20° in this embodiment. In this manner, the total number of the groove portions 151A and 151B, which is 12, is a multiple of, twice in this embodiment, the number of the engaging pieces 141. As shown in FIG. 7, the length L3 of each of the groove portions 151A and 151B as measured in the peripheral direction is longer than the length L4 of each engaging piece 141 as measured in the peripheral direction. Further, as shown in FIGS. 8 and 9, a bottom surface 151c of each of the groove portions 151A and 151B located in a pressing direction of the retaining fitting 133 is inclined such that the bottom surface 151c becomes deeper in a radially inward direction of the outer peripheral portion, and is located more in an opposite direction to the pressing direction of the retaining fitting 133 than a bottom surface 131a of each lead-out groove portion 131. Referring to FIG. 9, a position indicated by reference sign B corresponds to the position of the bottom surface 131a of the lead-out groove portion 131.

In the motor of this embodiment, the retaining fitting 133 is mounted as follows. First, the retaining fitting 133 is brought close to an opening 123a of the motor housing 107 such that the six groove portions 151A of the first group face the six engaging pieces 141. Then, the retaining fitting 133 is pressed into the fitting recessed portion 129 such that the six engaging pieces 141 are inserted into the six groove portions 151A. A leading end 141a of each engaging piece 141 abuts on the bottom surface 151c of the groove portion 151A and then abuts on an inner peripheral wall portion 129b, as shown in FIG. 9. Then, the six engaging pieces 141 warp in the opposite direction to the pressing direction of the retaining fitting 133. When the retaining fitting 133 is pressed into a fitting recessed portion 129a until the ring portion 139 abuts on a flange portion 137 of a bearing holder 109, leading ends 141a of the six engaging pieces 141 bite in the inner peripheral wall portion 129a due to resilient force by which the six engaging pieces 141 return to an original state from a warped state. Mounting of the bearing holder 109 is thereby completed.

When removing the retaining fitting 133 from the motor housing 107, the retaining fitting 133 is rotated in a counterclockwise direction as indicated by an arrow A3 on the page of FIG. 7 to position the leading ends 141a of the six engaging pieces 141 within the six lead-out groove portions 131, using a jig. Next, by taking out the engaging pieces 141 from the lead-out groove portions 131, the retaining fitting 133 is removed from the fitting recessed portion 129.

When a part of the six groove portions 151A or a part of the inner peripheral wall portion 129b in which the engaging pieces 141 have bitten is damaged, the retaining fitting 133 should be pressed into the fitting recessed portion 129 such that the six engaging pieces 141 are inserted into the groove portions 151B of the second group. Then, the bearing holder 109 may be mounted in the motor housing 107, using the retaining fitting 133.

In the motor of this embodiment, the retaining fitting 133 is pressed into the fitting recessed portion 129 such that the six engaging pieces 141 are inserted into the six groove portions 151A. The leading ends 141a of the engaging pieces 141 thereby abut on the inclined bottom surfaces 151c of the groove portions 151A and gently warp, and then abut on the inner peripheral wall portion 129b surrounding the fitting recessed portion 129. Thus, the engaging pieces 141 may be smoothly warped.

The total number of 12 of the groove portions 151A and 151B is a multiple of, namely, twice the number of the engaging pieces 141. Assume that, when the retaining fitting 133 is removed from the fitting recessed portion 129 and is mounted into the fitting recessed portion 129 again, a part of the six groove portions 151A in which the six engaging pieces 141 have been inserted or a part of the inner peripheral wall portion 129b in which the engaging pieces 141 have bitten is damaged. Then, by inserting the six engaging pieces 141 into the six groove portions 151B of the second group, which are different from the six groove portions 151A of the first group previously used, and then pressing the retaining fitting 133 into the fitting recessed portion 129, the bearing holder 109 may be securely mounted in the motor housing 107.

Figure 10:
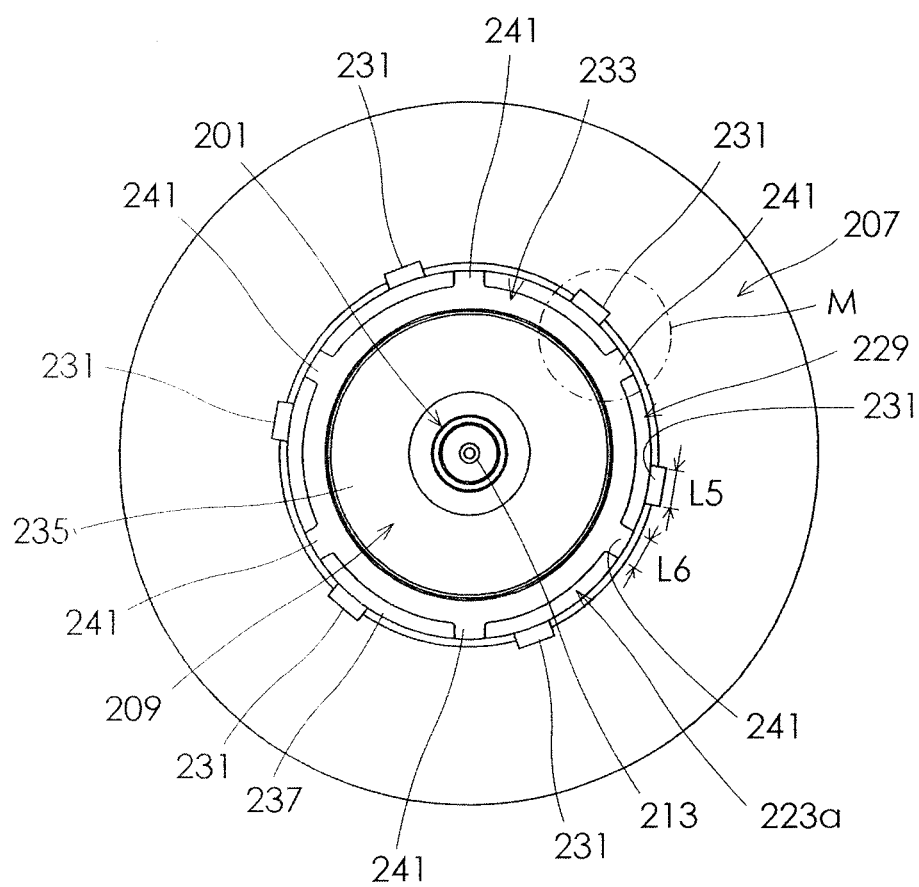
FIG. 10 is a plan view of a motor including a bearing holder mounting structure in still another embodiment of the present invention.
Figure 11:
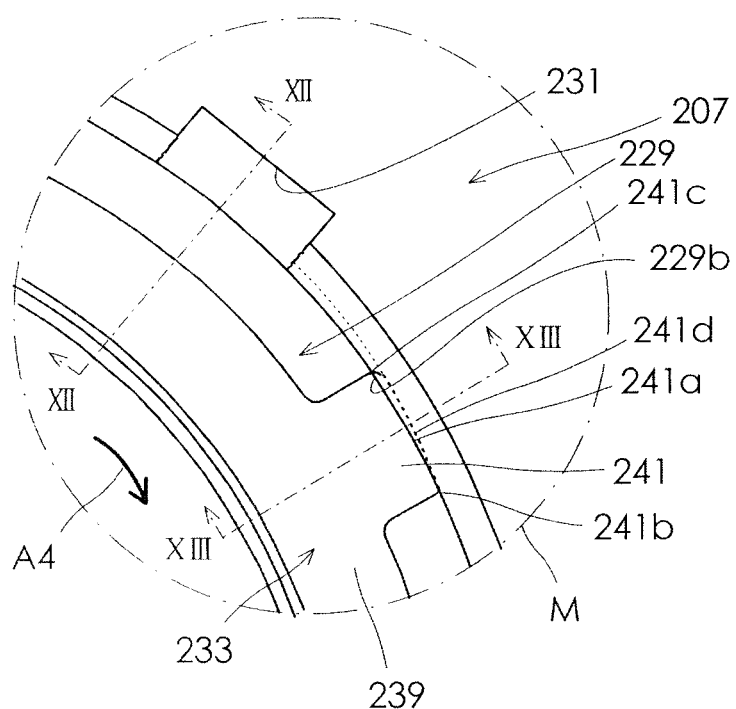
FIG. 11 is a partially enlarged view of FIG. 10.
Figure 12:
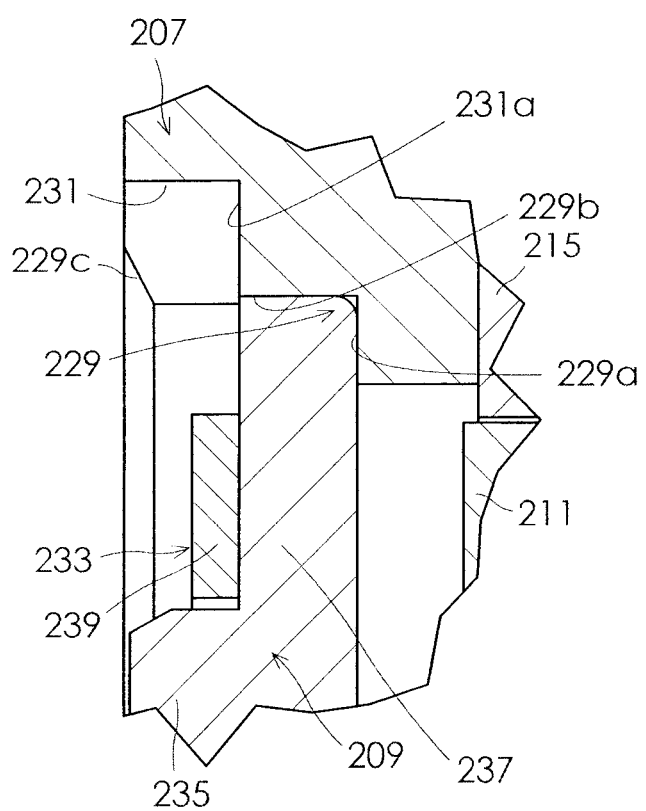
FIG. 12 is an enlarged view of a section taken along line XII-XII in FIG. 11.
Figure 13:
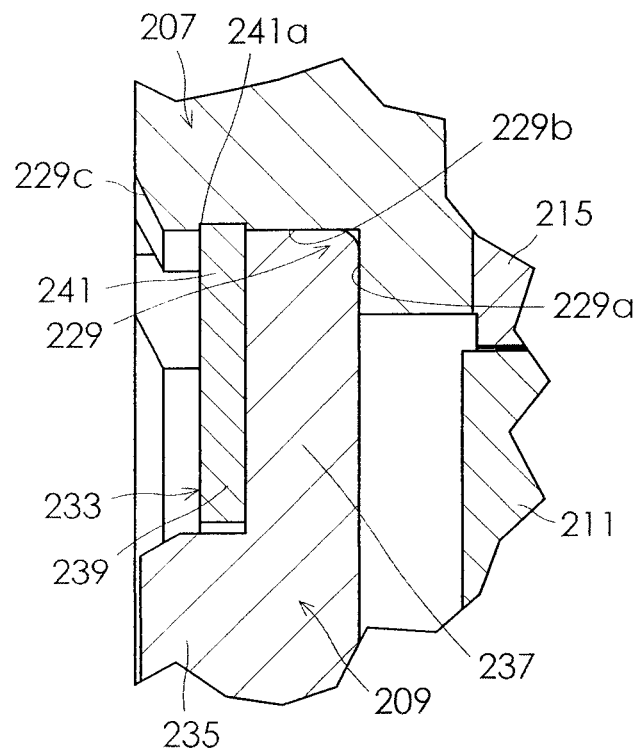
FIG. 13 is an enlarged view of a section taken along line XIII-XIII in FIG. 11.

FIG. 10 is a plan view of a motor including a bearing holder mounting structure in still another embodiment of the present invention. FIG. 11 is a partially enlarged view of portion of a region indicated by reference sign in FIG. 10. FIG. 12 is an enlarged view of a section taker along line XII-XII in FIG. 11. FIG. 13 is an enlarged view of a section taken along line XIII-XIII in FIG. 11. The motor of this embodiment has the same structure as the motor of the embodiment shown in FIGS. 1 to 6 except structures of a portion surrounding a fitting recessed portion 229 of a motor housing 207 and a retaining fitting 233. Therefore, reference numerals calculated by adding 200 to the reference numerals in FIGS. 1 to 6 are assigned to members which are the same as those of the motor of the embodiment shown in FIGS. 1 to 6. Then, descriptions of the same members will be omitted. Six groove portions 231 are formed at an outer peripheral portion of the fitting recessed portion 229. Each of the six groove portions 231 has substantially the same structure as each of the six lead-out groove portions 31 shown in FIG. 1. Specifically, the six groove portions 231 are formed at the outer peripheral portion of the fitting recessed portion 229 at angular intervals of 60° which are the same as six engaging pieces 241 of the retaining fitting 233. Then, these lead-out groove portions 231 open in an opposite direction to a pressing direction of the retaining fitting 233 and in a radially inward direction of a shaft 213. As shown in FIG. 10, the length L5 of each groove portion 231 as measured in a peripheral direction of a ring portion 239 is longer than the length L6 of each engaging piece 241 as measured in the peripheral direction. Further, as shown in FIG. 12, a bottom surface 231a of the groove portion 231 is located in the pressing direction such that the ring portion 239 of the retaining fitting 233 abuts on a flange portion 237 of a bearing holder 209 fitted in the fitting recessed portion 229 when leading ends 241a of the engaging pieces 241 of the retaining fitting 233 are inserted in the groove portions 231 and the retaining fitting 233 is fitted in the fitting recessed portion 229.

An inclined surface 241d is formed on a leading end 241a of each of the six engaging pieces 241 of the retaining fitting 233, as shown in FIG. 11. The inclined surface 241d is inclined such that the length of the engaging piece 241 as measured in a radial direction becomes longer from one end 241b to the other end 241c of the peripheral direction of the ring portion 239. Then, as shown in FIGS. 11 and 13, the leading end 241a of each of the six engaging pieces 241 bites in an inner peripheral wall portion 229b surrounding the fitting recessed portion 229.

In the motor of this embodiment, the retaining fitting 233 is mounted as follows. First, the retaining fitting 233 is brought close to an opening 223a of the motor housing 207 such that the six groove portions 231 face the six engaging pieces 241. Then, the six engaging pieces 241 are inserted into the six groove portions 231 to fit the retaining fitting 233 in the fitting recessed portion 229. Next, the retaining fitting 233 is rotated using a jig from this state by a predetermined angle in a direction from the other end 241c of the engaging piece 241 to the one end 241b of the engaging piece 241, namely, clockwise direction on the page of FIG. 11 as indicated by an arrow A4. Then, the leading ends 241a of the six engaging pieces 241 bite in the inner peripheral wall portion 229b surrounding the fitting recessed portion 229.

When removing the retaining fitting 209 from the motor housing 207, the retaining fitting 233 is rotated using a jig in a counterclockwise direction, namely, an opposite direction to the direction indicated by the arrow A4 on the page of FIG. 11 to position the leading ends 241a of the six engaging pieces 241 within the six groove portions 231, using the jig.

Next, by taking out the engaging pieces 241 from the groove portions 231, the retaining fitting 233 is removed from the fitting recessed portion 229.

In the motor of this embodiment as well, the leading ends 241a of the six engaging pieces 241 bite in the inner peripheral wall portion 229b. The bearing holder 209 may be thereby firmly mounted into the motor housing 207.

While the retaining fitting 233 of this embodiment has a flat shape, a retaining fitting may be used, having plurality of engaging pieces bent with respect to a ring portion.

The six groove portions 231 are provided in this embodiment. A plurality of the groove portions may be formed at angular intervals which are 1/n or one-nth time of the constant angular intervals of 60° in which the six engaging pieces 241 are formed. The groove portions may be formed at angular intervals of 30° which are half the intervals of 60°, for example. The number of the groove portions may thereby be 12. In this case, the number of the groove portions, which is 12, is twice the number of the six engaging pieces 241. When removing the retaining fitting 233 from the fitting recessed portion 229 and then mounting the retaining fitting 233 into the fitting recessed portion 229 again, the six engaging pieces 241 may be inserted into six groove portions that are different from the six groove portions previously used. The bearing holder 209 may thereby be securely mounted into the motor housing, using the unused six groove portions.

INDUSTRIAL APPLICABILITY

According to the present invention, just by disposing the bearing holder in the fitting recessed portion of the motor housing and pressing the retaining fitting in the fitting recessed portion, the bearing holder may be readily mounted into the motor housing. Further, when the retaining fitting is pressed into the fitting recessed portion, the leading ends of the engaging pieces of the retaining fitting bite in the wall portion surrounding the fitting recessed portion due to resilient force by which the engaging pieces return to the original state from the warped stage. Accordingly, the bearing holder may be firmly mounted in the motor housing.

The invention claimed is:

1. A bearing holder mounting structure configured to mount a bearing holder in a motor housing, comprising:
    the motor housing having a mounting hole formed therein, in which the bearing holder is fitted to be mounted in the motor housing, the motor housing including an annular fitting recessed portion formed at an outer end of the mounting hole,
    the bearing holder including:
        a holder body having a fitting hole formed therein, in which a bearing is fitted; and
        a flange portion unitarily formed with the holder body and fitted in the annular fitting recessed portion of the motor housing; and
    a retaining fitting for retaining the bearing holder, disposed outwardly on the flange portion and abutting on the flange portion so that the bearing holder does not come off from the mounting hole of the motor housing, the retaining fitting being fitted in the annular fitting recessed portion of the motor housing and having a larger hardness than a portion of the motor housing where the mounting hole is formed, the retaining fitting including:
        a ring portion configured to abut on the flange portion of the bearing holder; and
        a plurality of engaging pieces formed with the ring portion and configured to be engaged on a wall portion surrounding the annular fitting recessed portion, the engaging pieces being disposed at predetermined angular intervals in a peripheral direction of the ring portion and extending from the ring portion outwardly in a radial direction of the ring portion,
    wherein the material of the retaining fitting and shapes of the engaging pieces and the annular fitting recessed portion are determined such that, when the retaining fitting is pressed into the fitting recessed portion, the engaging pieces warp in an opposite direction to a pressing direction of the retaining fitting and leading ends of the engaging pieces bite in the wall portion due to resilient force by which the engaging pieces return to an original state from a warped state.

2. The bearing holder mounting structure according to claim 1, wherein:
    a plurality of lead-out groove portions are formed at an outer peripheral portion of the fitting recessed portion, the lead-out groove portions opening in the opposite direction and in a radially inward direction of the outer peripheral portion and disposed at the predetermined constant angular intervals; and
    the length of each lead-out groove portion as measured in the peripheral direction is longer than that of each engaging piece as measured in the peripheral direction, and a bottom surface of each lead-out groove portion is located more deeply in the pressing direction than the leading end of each engaging piece biting in the wall portion.

3. The bearing holder mounting structure according to claim 2, wherein:
    a plurality of groove portions are formed at the outer peripheral portion of the fitting recessed portion, the groove portions opening in the opposite direction and in the radially inward direction of the outer peripheral portion and disposed at predetermined angular intervals, which are 1/n or one-nth time of the predetermined constant intervals at which the engaging pieces are formed in the peripheral direction, n being an integer of at least one;
    the length of each groove portion as measured in the peripheral direction is longer than that of each engaging piece as measured in the peripheral direction, and a bottom surface of each groove portion is located in the pressing direction such that, when the leading ends of the engaging pieces of the retaining fitting are inserted into the groove portions and the retaining fitting is fitted in the fitting recessed portion, the ring portion abuts on the flange portion of the bearing holder which has been fitted in the fitting recessed portion; and
    the retaining fitting is rotated by a predetermined angle in the peripheral direction after the leading ends of the engaging pieces of the retaining fitting have been inserted into the groove portions and the retaining fitting has been fitted in the fitting recessed portion, and then the leading ends of the engaging pieces bite in the wall portion surrounding the fitting recessed portion.

4. The bearing holder mounting structure according to claim 3, wherein
    an inclined surface is formed on the leading end of each engaging piece such that the length of the engaging piece as measured in a radial direction becomes longer from one end of the peripheral direction to the other end of the peripheral direction.

5. The bearing holder mounting structure according to claim 4, wherein the bottom surface of each groove portion located in the pressing direction is inclined such that the bottom surface becomes deeper in the radially inward direction, and is located more in the opposite direction than the bottom surface of each lead-out groove portion.

6. The bearing holder mounting structure according to claim 2, wherein
an inclined surface, which is inclined in the radially outward direction of the outer peripheral portion, is formed between adjacent two of the lead-out groove portions at the outer peripheral portion of the fitting recessed portion.

7. A motor using the bearing holder mounting structure according to claim 1.

8. A motor comprising:
a rotor including a rotor member and a shaft on which the rotor member is fixed;
a stator disposed radially outwardly of the rotor member such that the rotor member rotates inside the stator;
a motor housing inside which the stator is securely disposed, the motor housing having a mounting hole formed therein, the motor housing including an annular fitting recessed portion formed at an outer end of the mounting hole;
a bearing holder configured to be fitted in the mounting hole of the motor housing to be mounted in the motor housing, the bearing holder including:
a holder body having a fitting hole formed therein; and
a flange portion unitarily formed with the holder body and configured to be fitted in the fitting recessed portion of the motor housing;
a pair of bearings for rotatably supporting both ends of the shaft, one of the bearings being fitted in the fitting hole of the holder body to be held by the bearing holder and the other bearing being held by the motor housing; and
a retaining fitting for retaining the bearing holder, disposed outwardly on the flange portion and abutting on the flange portion so that the bearing holder does not come off from the mounting hole of the motor housing, the retaining fitting being fitted in the annular fitting recessed portion of the motor housing and having a larger hardness than a portion of the motor housing where the mounting hole is formed, the retaining fitting including:
a ring portion configured to abut on the flange portion of the bearing holder; and
a plurality of engaging pieces formed with the ring portion and configured to be engaged on a wall portion surrounding the annular fitting recessed portion, the engaging pieces being disposed at constant angular intervals in a peripheral direction of the ring portion and extending from the ring portion outwardly in a radial direction of the ring portion, wherein:
the material of the retaining fitting and shapes of the engaging pieces and the annular fitting recessed portion are determined such that, when the retaining fitting is pressed into the fitting recessed portion, the engaging pieces warp in an opposite direction to a pressing direction of the retaining fitting and leading ends of the engaging pieces bite in the wall portion due to resilient force by which the engaging pieces return to an original state from a warped state;
a plurality of lead-out groove portions are formed at an outer peripheral portion of the fitting recessed portion, the lead-out groove portions opening in the opposite direction and in a radially inward direction of the outer peripheral portion and disposed at the constant angular intervals; and
the length of each lead-out groove portion as measured in the peripheral direction is longer than that of each engaging piece as measured in the peripheral direction, and a bottom surface of each lead-out groove portion is located more deeply in the pressing direction than the leading end of each engaging piece biting in the wall portion.

9. The motor according to claim 8, wherein:
a plurality of groove portions are formed at the outer peripheral portion of the fitting recessed portion, the groove portions opening in the opposite direction and in the radially inward direction of the outer peripheral portion and disposed at angular intervals, which are 1/n or one-nth time of the constant angular intervals, n being an integer of at least one;
the length of each groove portion as measured in the peripheral direction is longer than that of each engaging piece as measured in the peripheral direction, and a bottom surface of each groove portion is located in the pressing direction such that, when the leading ends of the engaging pieces of the retaining fitting are inserted into the groove portions and the retaining fitting is fitted in the fitting recessed portion, the ring portion abuts on the flange portion of the bearing holder which has been fitted in the fitting recessed portion; and
the retaining fitting is rotated by a predetermined angle in the peripheral direction after the leading ends of the engaging pieces of the retaining fitting have been inserted into the groove portions and the retaining fitting has been fitted in the fitting recessed portion, and then the leading ends of the engaging pieces bite in the wall portion surrounding the fitting recessed portion.

10. The motor according to claim 9, wherein:
the motor housing is mold formed of a synthetic resin material using the stator as an insert;
a receiving concave portion for receiving the rotor member is formed in the motor housing; and
an opening of the receiving concave portion forms the mounting hole.

11. The motor according to claim 8, wherein:
the motor housing having a bearing mounting hole formed at a position opposed to the mounting hole, for fitting with the other bearing;
an annular recessed portion is formed at an outer end of the bearing mounting hole concentrically with the bearing mounting hole;
the other bearing includes a flange; and
a resilient annular washer is disposed between the flange of the other bearing and the annular recessed portion of the bearing mounting hole.

12. The motor according to claim 9, wherein:
the motor housing having a bearing mounting hole formed at a position opposed to the mounting hole, for fitting with the other bearing;
an annular recessed portion is formed at an outer end of the bearing mounting hole concentrically with the bearing mounting hole;
the other bearing includes a flange; and
a resilient annular washer is disposed between the flange of the other bearing and the annular recessed portion of the bearing mounting hole.

* * * * *